United States Patent Office 3,385,871
Patented May 28, 1968

3,385,871
HALOGENATED CYCLOPROPYL AND CYCLO-
PROPENYL ESTRATRIENES AND PROCESS
FOR THEIR PREPARATION
John A. Edwards, Palo Alto, Calif., and Lawrence H.
Knox, Mexico City, Mexico, assignors to Syntex Corporation, Panama, Panama, a corporation of Panama
No Drawing. Filed Dec. 15, 1965, Ser. No. 514,136
17 Claims. (Cl. 260—397.4)

ABSTRACT OF THE DISCLOSURE

Steroids having an aromatic A-ring and substituted at C–17 with a dihalocyclopropyl, dihalocyclopropenyl, or oxocyclopropenyl group useful as estrogenic agents.

This invention relates to novel steroids and to processes for their preparation. Specifically, this invention is directed at steroids of the formula:

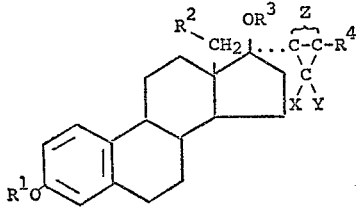

wherein $R^1$ is hydrogen, methyl, tetrahydropyranyl, or a hydrocarbon carboxylic acyl group;
$R^2$ is hydrogen or methyl;
$R^3$ is hydrogen, tetrahydropyranyl, or a hydrocarbon carboxylic acyl group;
$R^4$ is hydrogen, methyl, or chloro;
each of X and Y is chloro or fluoro; and
Z is a carbon-carbon double bond or a carbon-carbon single bond.

The hydrocarbon carboxylic acyl and acyloxy groups of the present invention contain less than 12 carbon atoms and may be of a straight, branched, cyclic or cyclic-aliphatic chain structure. This structure may be saturated, unsaturated, or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

The novel steroids provided by this invention demonstrate estrogenic activity and are useful in the treatment of the various conditions in which such agents are indicated, such as estrogen deficiencies, menopause, and the like. These compounds may also be used in veterinary medicine in the same manner as known estrogens and in the control and regulation of fertility. In addition, these agents demonstrate antiandrogen activity. They may be administered in the usual pharmaceutical forms at dosages appropriate for the condition being treated.

These compounds are prepared according to a process which may be represented as follows:

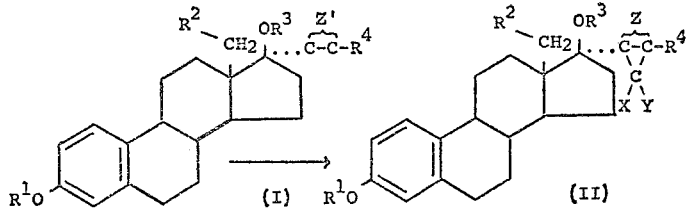

wherein $R^1$, $R^2$, $R^3$, $R^4$, Z, X and Y are as previously defined, and
Z' is a carbon-carbon double bond or a carbon-carbon triple bond.

In the practice of the foregoing transformation, an estra-1,3,5(10)-triene having vinyl, 1-propenyl, chlorovinyl, ethynyl, 1-propynyl or chloroethynyl group in the 17α-position (I) is treated with a dihalocarbene, as is generated for example from alkali metal salts of trihaloacetic acid, e.g., sodium trichloroacetate, sodium chlorodifluoroacetate, and sodium dichlorofluoroacetate, to yield the corresponding 17α-dihalocyclopropyl (Z=single bond) or 17α-dihalocyclopropenyl (Z=double bond) derivatives of Formula II. The reaction is executed under anhydrous conditions in an inert organic solvent such as diethylene glycol dimethyl ether, triethylene glycol dimethyl ether, or the like. The product forms directly and may be readily separated from the reaction mixture by conventional methods. Likewise, other reagents known to generate dihalocarbenes, such as trimethyl (trifluoromethyl) tin, phenyl (trichloromethyl) mercury, phenyl (bromodichloromethyl) mercury and the like, with sodium iodide, may also be used in a similar fashion.

The requisite starting material of Formula I wherein Z' is a triple bond is readily prepared from the corresponding 17-keto compound through conventional methods, e.g., treatment with acetylene and potassium t-butoxide, use of dichloroethylene and methyl lithium, use of alkynyl magnesium halides, and the like. The starting materials wherein Z' is a double bond are preferably obtained from the corresponding 17α-alkynyl compounds through controlled hydrogenation according to conventional procedures.

The resulting 17β-hydroxy-17α-alkenyl or -17α-alkynyl compounds may be converted to the corresponding 17β-acyloxy or 17β-tetrahydropyranyloxy derivatives via conventional methods prior to practicing the process of this invention or may be subjected thereto directly and, if desired, etherified or esterified thereafter.

The substituent in the 3-position of the estratriene nucleus of the compounds of the present invention may be a hydroxy group or an etherified, e.g., methoxy, tetrahydropyranyloxy etc., or esterified, e.g., acetoxy, benzoyloxy, etc., derivative thereof. These derivatives may be formed prior to the principal reaction of the present invention or may be formed thereafter via conventional methods. Thus, treatment with an appropriate acid anhydride, such as acetic anhydride, in pyridine with a 3,17β-dihydroxy compound of the present invention yields the 3-acyloxy-17β-hydroxy derivative selectively. Use of an acid anhydride in the presence of the corresponding acid and an acid catalyst such as p-toluenesulfonic acid yield the 3,17β-diacyloxy derivative. This diester may then be selectively saponified as through the use of methanolic potassium bicarbonate to yield the corresponding 3-hydroxy-17β-acyloxy derivative. Similarly, etherification may be performed via conventional procedures. Thus, treatment with dihydropyran in the presence of an acid catalyst such as p-toluenesulfonic acid, p-toluenesulfonyl chloride, dinitrobenzene sulfonic acid or the like, yield the corresponding tetrahydropyranyloxy derivative. Formation of the monotetrahydropyranyl ether may be accomplished by selective protection of other hydroxy groups as through ester formation, in the manner described above, with alkaline hydrolysis of such ester groups after formation of the tetrahydropyranyl ether. Formation of 3-methoxy derivatives may likewise be realized through the use of dimethylsulfate and potassium hydroxide.

The 17α-dihalocyclopropenyl derivatives of the present invention may be catalytically hydrogenated as with 5% palladium-on-charcoal to yield the corresponding dihalocyclopropyl derivatives.

In addition to the biological properties described above, the compounds of the present invention also serve as intermediates for the preparation of other novel estrogenic agents. Thus, treatment of a 17α-dihalocyclopropyl compound of the present invention with magnesium or an alkyl lithium reagent yields the corresponding 17α-propadienyl derivative. This transformation may be represented as follows:

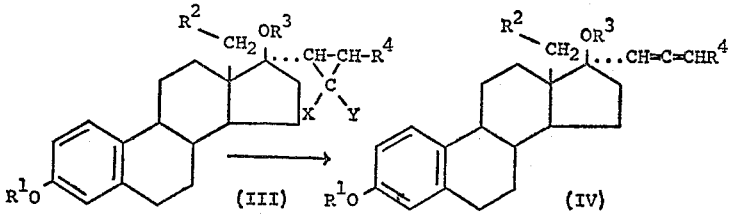

In the foregoing transformation, R², R³ and R⁴ are as described above. R¹ is preferably hydroxy, methoxy or acyloxy with the corresponding 3-tetrahydropyranyloxy derivatives being thereafter obtained from the corresponding 3-hydroxy compound via the procedure described above. This ring opening dehalogenation is preferably performed with those compounds wherein X and Y are chloro. In addition, compounds having a structure identical to that shown in Formula III but characterized by both X and Y being bromo groups are particularly useful intermediates for the preparation of 17α-propadienyl derivatives of Formula IV. Such 17α-dibromocyclopropyl compounds are readily prepared through the action of bromoform and potassium t-butoxide on a 17α-vinyl derivative of Formula I. The resultant 17α-dibromocyclopropyl compound is then subjected to the action of magnesium, as described above for the corresponding 17α-dichlorocyclopropyl derivative.

Brief acid hydrolysis, as with formic acid or hydrochloric acid, of the 17α-dihalocyclopropenyl compounds (Z=double bond) of the present invention results in formation of the corresponding 17α-cyclopropenones. This transformation may be represented as follows:

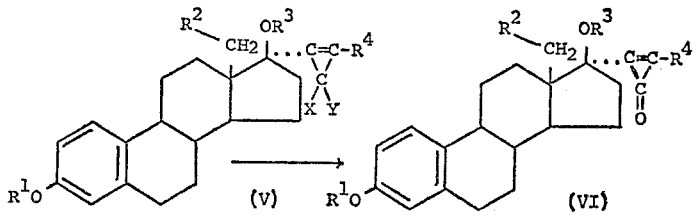

in which R¹, R², R³, R⁴ and X and Y are as previously defined.

As hereinabove described, compounds of Formulas IV and VI are estrogenic agents which may be used in the same fashion as the 17α-halocyclopropyl and 17α-halocyclopropenyl compounds of the present invention.

The following examples will serve to typify the nature of this invention but, being presented only for purposes of illustration, they should not be construed as a limitation thereof.

EXAMPLE 1

To a refluxing solution of 1 g. of 3-methoxy-17α-vinyl-17β-acetoxyestra-1,3,5(10)-triene in 10 ml. of diethylene glycol dimethyl ether is added over a two hour period in a dropwise fashion with stirring, a solution of 35 equivalents of sodium trichloroacetate in 40 ml. of diethylene glycol dimethyl ether. After refluxing for an additional hour, the mixture is filtered. The filtrate is evaporated to dryness and the residue is chromatographed on alumina, eluting with methylene chloride, to yield 3-methoxy-17α-(2',2'-dichlorocyclopropyl) - 17β-acetoxyestra-1,3,5(10)-triene.

In a like fashion, 3-methoxy-17α-vinyl-17β-acetoxy-18 methylestra-1,3,5(10)-triene and 17α-vinyl - 17β-acetoxyestra-1,3,5(10)-trien-3-ol are subjected to the foregoing procedure to yield 3-methoxy-17α-(2',2'-dichlorocyclopropyl) - 17β-acetoxy - 18-methylestra - 1,3,5(10)-triene and 17α - (2',2'-dichlorocyclopropyl) - 17β-acetoxyestra-1,3, 5(10)-trien-3-ol, respectively.

By use of sodium chlorodifluoroacetate in the foregoing procedure, there is obtained, respectively, 3-methoxy-17α - (2',2'-difluorocyclopropyl) - 17β-acetoxyestra - 1,3, 5(10)-triene; 3-methoxy - 17α-(2',2'-difluorocyclopropyl)-17β-acetoxy - 18-methylestra - 1,3,5(10)-triene and 17α-(2',2'-difluorocyclopropyl) - 17β-acetoxyestra - 1,3,5(10)-trien-3-ol.

The corresponding 17β-hydroxy derivatives may be alternatively used in the foregoing procedure, the products thus obtained being similarly unesterified in the 17β-position, i.e. 3-methoxy - 17α-(2',2'-dichlorocyclopropyl)-estra - 1,3,5(10)-trien - 17β-ol, 3-methoxy - 17α-(2',2'-dichlorocyclopropyl) - 18-methylestra - 1,3,5(10)-trien-17β-ol, 17α - (2',2'-dichlorocyclopropyl)-estra - 1,3,5(10)-triene-3,17β-diol, 3-methoxy - 17α(2',2'-difluorocyclopropyl)-estra - 1,3,5-trien - 17β-ol, 3-methoxy - 17α-(2',2'-difluorocyclopropyl) - 18-methylestra - 1,3,5(10)-trien-17β-ol, and 17α(2',2'-difluorocyclopropyl)-estra - 1,3,5(10)-triene-3,17β-diol.

The requisite 3 - methoxy - 17α - vinyl-17β-acetoxy-18-methylestra-1,3,5(10)-triene starting material may be obtained in the following manner.

A solution of 1 g. of 3-methoxy-18-methylestra-1,3, 5(10)-trien-17-one in 30 ml. of anhydrous benzene is added under nitrogen to a solution of 1.4 g. of potassium in 30 ml. of t-amyl alcohol. A slow current of purified acetylene is then passed through the solution for 40 hours. The mixture is diluted with water and extracted with benzene. These extracts are washed with water to neutrality, dried over sodium sulfate and evaporated. Chromatography of the residue on alkaline alumina with 2:3 hexane: benzene yields 3 - methoxy-17α-ethynyl-18-methylestra-1, 3,5(10)-trien-17β-ol which is recrystallized from acetone: hexane.

A solution of 1 g. of 3-methoxy-17α-ethynyl-18-methylestra-1,3,5(10)-trien-17β-ol in 40 ml. of pyridine is hydrogenated at 25° C. and atmospheric pressure in the presence of 0.4 g. of prehydrogenated 2% palladium-on-calcium carbonate until 1.1 molar equivalents of hydrogen are absorbed. The catalyst is removed by filtration through Celite diatomaceous earth and washed with ethyl acetate and the combined filtrate and washings are evaporated to dryness under reduced pressure. The residue is dissolved in ethyl acetate and this solution is then washed with dilute hydrochloric acid and water to neutrality, dried and evaporated to dryness to yield 3-methoxy-17α-vinyl-18-methylestra-1,3,5(10)-trien-17β-ol which is further purified through recrystallization from acetone.

A mixture of 1 g. of 3-methoxy-17α-vinyl-18-methylestra-1,3,5(10)-trien-17β-ol, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 3-methoxy-17α-vinyl - 17β-acetoxy-18-methylestra-1,3,5(10)-trien which is recrystallized from acetone:ether.

3 - methoxy - 17α-ethynyl-17β-acetoxy-18-methylestra-1,3,5(10)-triene is obtained in a similar fashion from its corresponding 17β-hydroxy compound.

EXAMPLE 2

To a solution of 5.0 g. of 17α-ethynyl-17β-acetoxyestra-1,3,5(10)-trien-3-ol in 75 ml. of dry diethylene glycol dimethyl ether is added 4.36 g. of sodium chlorodifluoroacetate. The mixture is heated at reflux for 15 minutes, cooled and an additional 4.36 g. of sodium chlorodifluoroacetate are added and refluxing is continued for 15 more minutes. This procedure is repeated until 17.32 g. of salt have been added. The mixture is then filtered and concentrated in vacuo. The residue is then chromatographed on Florisil absorbent, eluting with ether, to yield 17α-(2',2'-difluorocyclopropenyl) - 17β - acetoxyestra - 1,3,5(10) - trien-3-ol which is recrystallized from methanol.

In a similar fashion, 17α-(2',2'-difluorocyclopropenyl)-17β - acetoxy - 18 - methylestra-1,3,5(10)-trien-3-ol ; 3-methoxy - 17α-(2',2'-difluorocyclopropenyl)-17β-acetoxyestra-1,3,5(10)-trien and 3-methoxy-17α-(2',2'-difluorocyclopropenyl - 17β - acetoxy - 18 - methylestra - 1,3,5(10)-triene are obtained from the corresponding starting materials.

Alternatively, the corresponding free 17β-hydroxy compounds of the three foregoing starting materials may be employed in this procedure to yield 17α-(2',2'-difluorocyclopropenyl) - estra - 1,3,5(10)-triene-3,17β-diol; 17α-(2',2' - difluorocyclopropenyl)-18-methylestra-1,3,5(10)-trien-17β-ol and, if desired, these may by acylated.

EXAMPLE 3

By subjecting 3 - methoxy - 17α-chloroethynyl-17β-acetoxyestra-1,3,5(10)-triene to the procedure of Example 2, there is obtained 3 - methoxy - 17α - (2',2'-difluoro-3'-chlorocyclopropenyl - 17β - acetoxyestra-1,3,5(10)-triene. Likewise, from 17α-(1'-propynyl)-17β-acetoxyestra-1,3,5(10)-trien-3-ol there is obtained 17α-(2',2'-difluoro-3'-methylcyclopropenyl) - 17β-acetoxyestra-1,3,5(10)-trien-3-ol.

EXAMPLE 4

By employing sodium trichloroacetate in the procedure of Example 2, there are respectively obtained 17α-(2',2'-dichlorocyclopropenyl) - 17β - acetoxyestra - 1,3,5(10) - trien-3-ol; 17α - (2',2' - dichloropropenyl-17β-acetoxy-18-methylestra - 1,3,5(10)-trien-3-ol; 3-methoxy-17α-(2',2'-dichlorocyclopropenyl) - 17β-acetoxyestra-1,3,5(10)-triene and 3 - methoxy - 17α-(2',2'-dichlorocyclopropenyl)-17β-acetoxy 18-methylestra-1,3,5(10)-triene.

EXAMPLE 5

Two milliliters of dihydropyran are added to a solution of 1 g. of 3-methoxy-17α-(2',2'-difluorocyclopropyl)-estra-1,3,5(10)-trien-17β-ol in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 3-methoxy-17α-(2',2'-difluorocyclopropyl) - 17β - tetrahydropyranyloxyestra-1,3,5(10)-triene which is recrystallized from pentane.

Use of this process with the other 17β-hydroxy compounds of the present invention will similarly yield the corresponding 17β-tetrahydropyranyloxy derivatives.

EXAMPLE 6

A mixture of 1 g. of 17α-(2',2'-dichlorocyclopropyl)-estra-1,3,5(10)-triene-3,17β-diol, 4 ml. of pyridine and 2 ml. of acetic anhydride is allowed to stand at room temperature for 15 hours. The mixture is then poured into ice water and the solid which forms is collected by filtration, washed with water and dried to yield 3-acetoxy-17α-(2',2' - dichlorocyclopropyl) - estra-1,3,5(10)-trien-17β-ol which may be further purified through recrystallization from acetone:hexane.

In a similar manner, the other 3-hydroxy compounds of the present invention may be selectively converted to the corresponding 3-acetoxy derivatives, as for example 3β-acetoxy-(2',2'-difluorocyclopropenyl) - estra - 1,3,5(10)-trien-17β-ol. Through the use of other anhydrides in the foregoing procedures, the corresponding 3-acylates are similarly prepared.

EXAMPLE 7

A mixture of 1 g. of 17α-(2',2'-difluorocyclopropyl)-estra-1,3,5(10)-triene-3,17β-diol, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 3,17β-diacetoxy - 17α - (2',2'-difluorocyclopropyl)-estra - 1,3,5 (10)-triene, which is recrystallized from acetone:ether.

One gram of 3,17β-diacetoxy-17α-(2',2'-difluorocyclopropyl)-estra-1,3,5(10)-triene is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 17β-acetoxy-17α-(2',2'-difluorocyclopropyl)-estra-1,3,5(10)-trien-3-ol which is collected by filtration and recrystallized from acetone:hexane.

Two milliliters of dihydropyran are added to a solution of 1 g. of 17β-acetoxy - 17α - (2',2'-difluorocyclopropyl)-estra-1,3,5(10)-trien-3-ol in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 3-tetrahydropyranyloxy - 17β - acetoxy-17α-(2',2' - difluorocyclopropyl) - estra - 1,3,5(10)-triene which is recrystallized from pentane.

A solution of 0.17 g. of potassium hydroxide in 0.2 ml. of water and 2.5 ml. of methanol is added over 30 mintues to a refluxing solution of 1 g. of 3-tetrahydropyranyloxy-17β-acetoxy - 17α - (2',2'-difluorocyclopropyl)-estra-1,3,5(10)-triene in 30 ml. of methanol under nitrogen. The solution is refluxed for 2 hours, cooled, neutralized with acetic acid and concentrated under reduced pressure. After the addition of water, the solid which forms is collected by filtration and dried to yield 3-tetrahydropyranyloxy - 17α - (2',2'-difluorocyclopropyl)-estra-1,3,5 (10)-trien-17β-ol which is recrystallized from acetone:hexane.

EXAMPLE 8

Two milliliters of dihydropyran are added to a solution of 1 g. of 3-acetoxy - 17α - (2',2'-dichlorocyclopropyl)- estra-1,3,5(10)-trien-17β-ol in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 3-acetoxy-17α-(2',2'-dichlorocyclopropyl) - 17β - tetrahydropyranyloxyestra-1,3,5(10)-triene which is recrystallized from pentane.

One gram of 3-acetoxy-17α-(2',2'-dichlorocyclopropyl)-17β-tetrahydropyranloxyestra-1,3,5(10)-triene is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 17α-(2',2'-dichlorocyclopropyl) - 17β - tetrahydropyranyloxyestra-1,3,5(10)-trien-3-ol, which is collected by filtration and recrystallized from acetone:hexane.

EXAMPLE 9

To a refluxing solution of 1 g. of 3-methoxy-17α-(2',2'-dichlorocyclopropyl) - 17β - acetoxyestra - 1,3,5(10)-triene, 1.3 g. of magnesium shavings, and 25 ml. of anhydrous ether are added over a one hour period 5.7 g. of ethyl bromide. When the addition is complete, the reaction mixture is refluxed an additional hour and then cautiously hydrolyzed by a dropwise addition of water, followed by 10% hydrochloric acid. The ether layer is separated, dried and evaporated to give 3-methoxy-17α-propadienyl-17β-acetoxyestra-1,3,5(10)-triene.

By likewise subjecting the other 17α-(2',2'-dihalocyclopropyl) derivatives of the present invention to the procedure of this example, the corresponding 17α-propadienyl derivatives are obtained.

EXAMPLE 10

To 3.2 ml. of cold (0°) concentrated hydrochloric acid is added with stirring, 0.1 g. of 3-methoxy-17α-(2',2'-difluorocyclopropenyl) - 17β - acetoxyestra - 1,3,5(10)-triene. The mixture is stirred until the steroid is completely dissolved, then stirred for one additional minute, and finally poured into a mixture of aqueous sodium bicarbonate and ethyl acetate. The organic layer is separated and the aqueous phase extracted with ethyl acetate. The combined organic solutions are then washed with water to neutrality, dried over sodium sulfate and evaporated to dryness to yield 3-methoxy - 17α - oxocyclopropenyl-17β-acetoxyestra-1,3,5(10)-triene which may be further purified through recrystallization from methanol.

In a similar fashion the following compounds are obtained from the corresponding 17α-(2',2'-difluorocyclopropenyl) via the foregoing procedure 3-methoxy-17α-oxocyclopropenyl-17β-acetoxy-18-methylestra-1,3,5(10)-triene;
3-methoxy-17α-oxocyclopropenylestra-1,3,5(10)-trien-17β-ol;
2-methoxy-17α-oxocyclopropenyl-18-methylestra-1,3,5(10)-trien-17β-ol;
17α-oxocyclopropenyl-17β-acetoxyestra-1,3,5(10)-trien-3-ol;
17α-oxocyclopropenyl-17β-acetoxy-18-methylestra-1,3,5(10)-trien-3-ol;
17α-oxocyclopropenylestra-1,3,5(10)-triene-3,17β-diol and
17α-oxocyclopropenylestra-18-methylestra-1,3,5(10)-triene-3,17β-diol.

EXAMPLE 11

Two milliliters of dihydropyran are added to a solution of 1 g. of 17α - oxocyclopropenyl - 17β - acetoxyestra-1,3,5(10) - trien - 3 - ol in 15 ml. of benzene. About 1 ml. is removed by distillation to remove moisture and 0.4 g. of p - toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3 - tetrahydropyranyloxy - 17α - oxocyclopropenyl - 17β - acetoxyestra - 1,3,5 (10) - triene which is recrystallized from pentane.

What is claimed is:
1. Compounds of the formula:

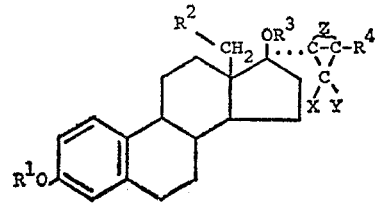

wherein
$R^1$ is hydrogen, methyl, tetrahydropyranyl or a hydrocarbon carboxylic acyl group of less than 12 carbon atoms;
$R^2$ is hydrogen or methyl;
$R^3$ is hydrogen, tetrahydropyranyl or a hydrocarbon carboxylic acyl group of less than 12 carbon atoms;
$R^4$ is hydrogen, methyl or chloro;
each of X and R is chloro or fluoro; and
Z is a carbon-carbon single bond or a carbon-carbon double bond.

2. Compounds according to claim 1 wherein
Z is a carbon-carbon single bond;
each of X and R is fluoro;
$R^4$ is hydrogen; and
$R^1$, $R^2$ and $R^3$ are as therein defined.

3. The compound according to claim 2 wherein
$R^1$ is hydrogen;
$R^2$ is hydrogen; and
$R^3$ is hydrogen.

4. The compound according to claim 2 wherein
$R^1$ is methyl;
$R^2$ is hydrogen; and
$R^3$ is hydrogen.

5. The compound according to claim 2 wherein
$R^1$ is hydrogen;
$R^2$ is methyl; and
$R^3$ is hydrogen.

6. The compound according to claim 2 wherein
$R^1$ is methyl;
$R^2$ is methyl; and
$R^3$ is hydrogen.

7. Compounds according to claim 1 wherein
Z is a carbon-carbon double bond;
each of X and Y is fluoro;
$R^4$ is hydrogen; and
$R^1$, $R^2$ and $R^3$ are as therein defined.

8. The compound according to claim 7 wherein
$R^1$ is hydrogen;
$R^2$ is hydrogen; and
$R^3$ is hydrogen.

9. The compound according to claim 7 wherein
$R^1$ is methyl;
$R^2$ is hydrogen; and
$R^3$ is hydrogen.

10. The compound according to claim 7 wherein
$R^1$ is hydrogen;
$R^2$ is methyl; and
$R^3$ is hydrogen.

11. The compound according to claim 7 wherein
$R^1$ is methyl;
$R^2$ is methyl; and
$R^3$ is hydrogen.

12. Compounds of the formula:

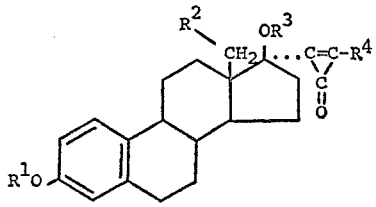

wherein
- $R^1$ is hydrogen, methyl, tetrahydropyranyl or a hydrocarbon carboxylic acyl group of less than 12 carbon atoms;
- $R^2$ is hydrogen or methyl;
- $R^3$ is hydrogen, tetrahydropyranyl or a hydrocarbon carboxylic acyl group of less than 12 carbon atoms; and
- $R^4$ is hydrogen, methyl or chloro.

13. Compounds according to claim 12 wherein $R^4$ is hydrogen; and $R^1$, $R^2$ and $R^3$ are as therein defined.

14. The compound according to claim 13 wherein
$R^1$ is hydrogen;
$R^2$ is hydrogen; and
$R^3$ is hydrogen.

15. The compound according to claim 13 wherein
$R^1$ is methyl;
$R^2$ is hydrogen; and
$R^3$ is hydrogen.

16. The compound according to claim 13 wherein
$R^1$ is hydrogen;
$R^2$ is methyl; and
$R^3$ is hydrogen.

17. The compound according to claim 13 wherein
$R^1$ is methyl;
$R^2$ is methyl; and
$R^3$ is hydrogen.

References Cited

Lehmann et al.: Ber. Deut. Chem. Ges. 98, 1470–1475 (1956) (p. 1472 relied on).

LEWIS GOTTS, *Primary Examiner.*

T. M. MESHBESHER, *Assistant Examiner.*

UNITED STATES PATENT OFFICE
CERTIFICATE OF CORRECTION

Patent No. 3,385,871 May 28, 1968

John A. Edwards, et al.

It is certified that error appears in the above identified patent and that said Letters Patent are hereby corrected as shown below:

Column 7, line 61, "2-methoxy" should read -- 3-methoxy --. Column 8, lines 32 and 37, "R", each occurrence, should read -- Y --.

Signed and sealed this 2nd day of December 1969.

(SEAL)
Attest:

Edward M. Fletcher, Jr.
Attesting Officer

WILLIAM E. SCHUYLER, JR.
Commissioner of Patents